(12) United States Patent
Sato et al.

(10) Patent No.: US 11,773,301 B2
(45) Date of Patent: Oct. 3, 2023

(54) RESIN COMPOSITION

(71) Applicant: NAMICS CORPORATION, Niigata (JP)

(72) Inventors: Ayako Sato, Niigata (JP); Fuminori Arai, Niigata (JP)

(73) Assignee: NAMICS CORPORATION, Niigata (JP)

( * ) Notice: Subject to any disclaimer, the term of this patent is extended or adjusted under 35 U.S.C. 154(b) by 339 days.

(21) Appl. No.: 17/282,696

(22) PCT Filed: Oct. 4, 2019

(86) PCT No.: PCT/JP2019/039261
§ 371 (c)(1),
(2) Date: Apr. 2, 2021

(87) PCT Pub. No.: WO2020/071526
PCT Pub. Date: Apr. 9, 2020

(65) Prior Publication Data
US 2021/0380851 A1    Dec. 9, 2021

(30) Foreign Application Priority Data

Oct. 5, 2018    (JP) .................................. 2018-190106

(51) Int. Cl.
  C09J 135/02    (2006.01)
  C09J 4/00    (2006.01)
  C08F 122/14    (2006.01)
  C08F 2/40    (2006.01)

(52) U.S. Cl.
  CPC .......... C09J 135/02 (2013.01); C08F 122/14 (2013.01); C09J 4/00 (2013.01)

(58) Field of Classification Search
  CPC ......... C08F 2/40; C08F 122/14; C09J 135/02; C09J 4/00
  See application file for complete search history.

(56) References Cited

U.S. PATENT DOCUMENTS

| 4,160,864 | A   |   | 7/1979  | Ponticello et al. |
| 4,182,823 | A   | * | 1/1980  | Schoenberg ............ C08F 22/32 558/305 |
| 9,181,365 | B2  | * | 11/2015 | Malofsky ................ C08F 22/14 |
| 9,249,265 | B1  |   | 2/2016  | Stevenson et al. |
| 9,279,022 | B1  |   | 3/2016  | Palsule et al. |

(Continued)

FOREIGN PATENT DOCUMENTS

| EP | 2792694 A1 | 10/2014 |
| EP | 2926368 A1 | 10/2015 |

(Continued)

OTHER PUBLICATIONS

International Search Report (ISR) (and English translation thereof) dated Nov. 5, 2019 issued in International Application No. PCT/JP2019/039261.

(Continued)

*Primary Examiner* — Vu A Nguyen
(74) *Attorney, Agent, or Firm* — Holtz, Holtz & Volek PC

(57) ABSTRACT

A resin composition includes (a) at least one 2-methylene-1,3-dicarbonyl compound, (b) an initiator comprising at least one basic substance, and (c) an anionic polymerization inhibitor including at least one borate ester compound.

12 Claims, 1 Drawing Sheet

(56) References Cited

U.S. PATENT DOCUMENTS

| | | |
|---|---|---|
| 9,676,875 B2 | 6/2017 | Palsule et al. |
| 9,752,059 B2 | 9/2017 | Malofsky et al. |
| 9,790,295 B2 | 10/2017 | Sullivan et al. |
| 9,969,819 B2 | 5/2018 | Palsule et al. |
| 10,081,685 B2 | 9/2018 | Stevenson et al. |
| 10,167,348 B2 | 1/2019 | Palsule et al. |
| 10,607,910 B2 | 3/2020 | Malofsky et al. |
| 2002/0027294 A1 | 3/2002 | Neuhaus et al. |
| 2014/0221532 A1 | 8/2014 | Wu et al. |
| 2014/0329926 A1 | 11/2014 | Kirino |
| 2015/0073110 A1 | 3/2015 | Malofsky et al. |
| 2015/0104660 A1 | 4/2015 | Malofsky et al. |
| 2015/0210894 A1 | 7/2015 | Malofsky et al. |
| 2015/0303122 A1 | 10/2015 | Malofsky et al. |
| 2015/0361283 A1 | 12/2015 | Malofsky et al. |
| 2016/0068621 A1 | 3/2016 | Sullivan et al. |
| 2016/0096906 A1 | 4/2016 | Palsule et al. |
| 2017/0240657 A1 | 8/2017 | Palsule et al. |
| 2017/0253675 A1 | 9/2017 | Palsule et al. |
| 2020/0148922 A1 | 5/2020 | Arai et al. |
| 2020/0219781 A1 | 7/2020 | Malofsky et al. |
| 2020/0283551 A1 | 9/2020 | Arai et al. |

FOREIGN PATENT DOCUMENTS

| | | |
|---|---|---|
| JP | S53031740 A | 3/1978 |
| JP | 2004504730 A | 2/2004 |
| JP | 2007177014 A | 7/2007 |
| JP | 2014531505 A | 11/2014 |
| JP | 2015512460 A | 4/2015 |
| JP | 2015517973 A | 6/2015 |
| JP | 2015519416 A | 7/2015 |
| JP | 2016506072 A | 2/2016 |
| JP | 2017036361 A | 2/2017 |
| JP | 2017526791 A | 9/2017 |
| JP | 2017527667 A | 9/2017 |
| JP | 2017527668 A | 9/2017 |
| JP | 2018517809 A | 7/2018 |
| WO | 2013059473 A2 | 4/2013 |
| WO | 2014078689 A1 | 5/2014 |
| WO | 2014085570 A1 | 6/2014 |
| WO | 2016040261 A1 | 3/2016 |
| WO | 2016205605 A1 | 12/2016 |
| WO | 2018212330 A1 | 11/2018 |
| WO | 2019088102 A1 | 5/2019 |
| WO | 2019137853 A1 | 7/2019 |

OTHER PUBLICATIONS

Written Opinion dated Nov. 5, 2019 issued in International Application No. PCT/JP2019/039261.
Extended European Search Report (EESR) dated Jun. 10, 2022, issued in counterpart European Application No. 19868347.6.
Extended European Search Report (EESR) dated Jun. 21, 2021 issued in European Application No. 18871993.4.
Notice of Allowance dated Oct. 12, 2021 issued in U.S. Appl. No. 16/759,886.
Chinese Office Action (and English language translation thereof) dated Dec. 23, 2020 issued in Chinese Application No. 201880070166.7.
International Search Report (ISR) (and English translation thereof) dated Dec. 24, 2019 issued in International Application No. PCT/JP2019/039628.
International Search Report (ISR) (and English translation thereof) dated Jan. 15, 2019 issued in International Application No. PCT/JP2018/040337.
Written Opinion dated Jan. 15, 2019 issued in International Application No. PCT/JP2018/040337.
Related U.S. Appl. No. 16/759,886, First Named Inventor: Fuminori Arai; Title: "Resin Composition"; filed Apr. 28, 2020.
Related U.S. Appl. No. 17/283,540, First Named Inventor: Fuminori Arai; Title: "Curing Agent Composition for Curing 2-Methylene-1.3-Dicarbonyl Compound"; filed Apr. 7, 2021.
Written Opinion dated Dec. 24, 2019 issued in International Application No. PCT/JP2019/039628.
U.S. Appl. No. 17/768,883, First Named Inventor: Ayako Sato; Title: "Polymerizable Composition and Curable Resin Composition Using Same"; filed Apr. 14, 2022.

\* cited by examiner

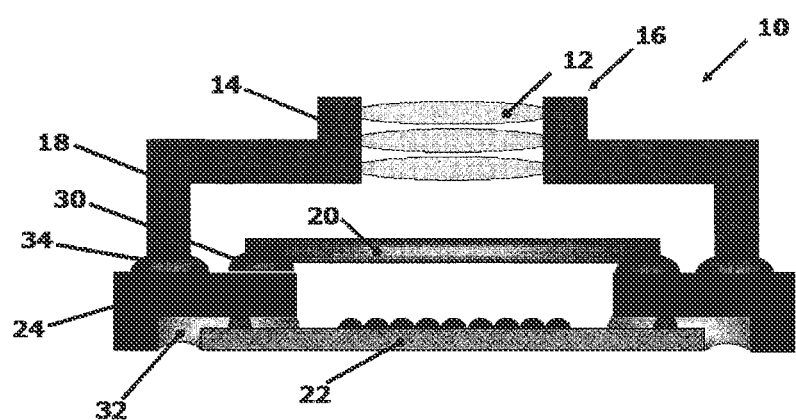

RESIN COMPOSITION

TECHNICAL FIELD

The present invention relates to a resin composition suitable for one-part adhesives for applications that require thermal curing at low temperatures, preferably at room temperature.

BACKGROUND ART

Conventionally known one-part adhesives for electronic components include thiol-based adhesives comprising an epoxy resin, a polythiol compound, and a curing accelerator as essential components, and acrylate resin-based adhesives comprising a radical initiator as an essential component, and some of these adhesives are known to be curable at about 80° C. However, there is a need for one-part adhesives that are curable at even lower temperatures in order to improve manufacturing efficiency.

In recent years, there have been disclosures, as in Patent Documents 1 and 2, of resin compositions that comprise a methylene malonate compound (2-methylene-1,3-dicarbonyl compound) and can be cured in a short time even at low temperatures such as room temperature. Patent documents 1 and 2 disclose that the curing reaction of 2-methylene-1,3-dicarbonyl compounds is initiated by a basic compound.

The curing time of epoxy resin compositions and acrylate resin compositions, which are frequently used as one-part adhesives for electronic components, can be adjusted typically by using a catalyst that activates the reaction site.

By contrast, since the reaction site of a resin composition comprising a 2-methylene-1,3-dicarbonyl compound is doubly activated by the two carbonyl groups, it does not necessarily require a catalyst to be cured at or above room temperature, and the curing speed is quite high even when a very small amount of a basic compound that serves as an initiator is used. For this reason, it is difficult to fine-tune the curing time of resin compositions comprising 2-methylene-1,3-dicarbonyl compounds only by adjusting the type and amount of the basic compound. In addition, such resin compositions will exhibit a large variability in properties.

Other methods for regulating curing time include use of latent forms of catalysts and initiators, and the addition of stabilizers. Patent Document 2, for example, discloses the use of a erotic acid, such as a carboxylic acid, a sulfonic acid, and a phosphoric acid, as a stabilizer for controlling the effect of the basic compound used in the curing of a resin composition comprising a 2-methylene-1,3-dicarbonyl compound thereby inhibiting the curing of the resin composition. It is believed that when these protic acids are used, the protons released add to the basic compound, thereby suppressing its effectiveness as an initiator, and also add to nucleophilic sites in the growing polymer chain, thereby terminating the polymerization.

PRIOR ART DOCUMENTS

Patent Documents

Patent Document 1: Japanese Translation of PCT International Application Publication No. JP-T-2017-527667

Patent Document 2: Japanese Translation of PCT International Application Publication No. JP-T-2018-517809

SUMMARY OF THE INVENTION

Problems to be Solved by the Invention

The effect of these protic acids as anionic polymerization inhibitors is very high, and the addition of a very small amount is sufficient to inhibit curing. However, this means that slight changes in the amount of a protic acid can cause significant changes in curing speed. In addition, the storage stability of the resin composition and the physical properties of the cured product obtained upon curing are also greatly affected by small changes in the amount of the protic acid. When a protic acid is used as an anionic polymerization inhibitor for controlling curing speed, therefore, an extremely fine control of the amount of the protic, acid is required, making fine adjustment of the curing time difficult. In addition, the variability in the amount of each component that inevitably occurs in the actual production of the resin composition results in great changes in various properties of the resin composition, especially its curing time, making it difficult to consistently produce a resin composition that has fixed properties.

An object of the present invention is to provide a resin composition that can be manufactured consistently with reduced variability in properties (in particular, curing speed) and leads to improved productivity and that is suitable for the manufacture of electronic components, in order to solve the problems of the prior art described above.

Solution to the Problems

As a result of intensive research to solve the above-mentioned problems, the present inventors have arrived at the present invention.

That is, the present invention includes, but is not limited to, the following inventions.

1. A resin composition, comprising components (a) to (c) below:
   (a) at least one 2-methylene-1,3-dicarbonyl compound,
   (b) an initiator comprising at least one basic substance, and
   (c) an anionic polymerization inhibitor comprising at least one borate ester compound;
   wherein the 2-methylene-1,3-dicarbonyl compound is a compound comprising at least one structural unit represented by formula (I) below.

2. The resin composition according to preceding item 1, wherein the borate ester compound is at least one selected from the group consisting of triisopropyl borate, tri-t-butyl borate, and tri-o-tolyl borate.

3. The resin composition according to preceding item 1 or 2, wherein the basic substance is an amine compound.

4. The resin composition according to any one of preceding items 1 to 3, wherein the basic substance is a tertiary amine compound.

5. The resin composition according to any one of preceding items 1 to 4, wherein the 2-methylene-1,3-dicarbonyl compound has a molecular weight of 180 or higher and 10,000 or lower.

6. A one-part adhesive comprising the resin composition according to any one of preceding items 1 to 5.

7. The one-part adhesive according to preceding item 6, for electronic components.

Effect of the Invention

The resin composition of the present invention comprises an initiator and a borate ester compound, which serves as an anionic polymerization inhibitor for adjusting curing speed. This makes it easy to fine-tune the curing speed of the resin composition of the present invention by increasing or decreasing the amounts of the initiator and the borate ester compound within manageable ranges. In addition, even if there is unavoidable variability in compositional ratios in the actual manufacture of the resin composition of the present invention, the various properties including curing speed do not change so greatly. This means that the resin composition of the present invention can be manufactured consistently with reduced variability in properties. Furthermore, the resin composition of the present invention shows a curing time suitable for the purpose of use, thereby allowing productivity to be improved.

BRIEF DESCRIPTION OF THE DRAWINGS

FIG. 1 is a cross-sectional view of a camera module.

DESCRIPTION OF EMBODIMENTS

Embodiments of the prevent invention are described in detail below.

The resin composition of the present invention comprises the following components (a) through (c):

(a) at least one 2-methylene-1,3-dicarbonyl compound, (b) an initiator comprising at least one basic substance, and (c) an anionic polymerization inhibitor comprising at least one borate ester compound.

The 2-methylene-1,3-dicarbonyl compound of component (a) is a compound comprising at least one structural unit represented by formula (I) below.

Components (a) through (c) above will be described below.

2-Methylene-1,3-Dicarbonyl Compound (Component (a))

The 2-methylene-1,3-dicarbonyl compound (component (a)) used in the present invention is a compound comprising a structural unit represented by formula (I) below.

Component (a) comprises one or two or more of structural units of formula (I) above. In some embodiments, component (a) comprises two to six, preferably two, structural units of formula (I) above.

The 2-methylene-1,3-dicarbonyl compound can be used as component (a) in the present invention, because it comprises a structural unit of formula (I) above, and these structural units polymerize with each other in the presence of an initiator, typically a basic substance (the initiator (component (b)) described below). If the 2-methylene-1,3-dicarbonyl compounds comprise 2-methylene-1,3-dicarbonyl compounds that comprise two or more structural units of formula (I) above (multifunctional components), cross-links are formed during curing, and this is expected to result in improvement in physical properties of the cured product such as enhanced mechanical properties at high temperatures.

Component (a) comprises at least one 2-methylene-1,3-dicarbonyl compound. The 2-methylene-1,3-dicarbonyl compound contained in component (a) preferably has a molecular weight of 180 to 10,000, more preferably 180 to 5,000, even more preferably 180 to 2,000, even more preferably 220 to 2,000, even more preferably 200 to 1,500, even more preferably 240 to 1,500, particularly preferably 250 to 1,500, and most preferably 250 to 1,000. The molecular weight of the 2-methylene-1,3-dicarbonyl compound contained in component (a) and the amount by mass of each 2-methylene-1,3-dicarbonyl compound contained relative to the entire resin composition (or the totality of the 2-methylene-1,3-dicarbonyl compounds in the resin composition) of 1, can be determined, for example, by means of reverse phase high performance liquid chromatography (reverse phase HPLC) using an ODS column for the column and a mass spectrometer (MS) for the detector with PDA (detection wavelength: 190 nm to 800 nm) or ELSD quantification. If the molecular weight of component (a) is less than 180, the vapor pressure at 25° C. may be excessively high, which may cause various problems arising from volatiles. In particular, volatiles will, on adhering to components in their vicinity, be cured by bases on the surface, leading to contamination of the components in their vicinity. By contrast, if the molecular weight of component (a) exceeds 10,000, it results in the viscosity of the resin composition becoming high, which decreases workability and also causes other issues such as imposing limitations on the amount of fillers that can be added.

Component (a) may comprise a multifunctional component. Multifunctional herein means that the 2-methylene-1,3-dicarbonyl compound comprises two or more structural units of formula (I) above. The number of structural units of formula (I) contained in a 2-methylene-1,3-dicarbonyl compound is referred to as the "number of functional groups" of the 2-methylene-1,3-dicarbonyl compound. Of the 2-methylene-1,3-dicarbonyl compounds, those for which the number of functional groups is one are called "monofunctional"; those for which the number of functional groups is two are called "bifunctional"; and those for which the number of functional groups is three are called "trifunctional." Since a cured product obtained when using a component (a) that comprises a multifunctional component is cross-linked, the cured product has improved physical properties, such as heat resistance and mechanical properties at high temperatures. When a multifunctional component is used, the ratio by mass of the multifunctional component is preferably 0.01 or greater relative to the entire resin composition of the present invention of 1. In an embodiment, the ratio by mass of those of component (a) that comprise two or more structural units represented by formula (I) above is preferably 0.01 to 1.00, more preferably 0.05 to 0.95, even more preferably 0.05 to 0.90, particularly preferably 0.10 to 0.90, most preferably 0.20 to 0.80, relative to the entire resin composition of the present invention of 1.

If component (a) comprises a multifunctional component, a network-like cross-linked structure is formed in the cured product, with the result that the cured product does not flow and maintains a constant storage modulus even at high temperatures, in particular, at temperatures equal to or higher than its glass transition temperature. The storage modulus of the cured product at high temperatures can be measured, for example, by dynamic mechanical analysis (DMA). Typically, if a cured product having a cross-linked structure formed therein is measured by DMA, a region known as a plateau is observed over a wide temperature range above its glass transition temperature where changes in storage modulus are relatively small as the temperature changes. The storage modulus in this plateau region is evaluated as a quantity related to crosslink density, i.e., the proportion of the multifunctional component in component (a).

In an embodiment, the ratio by mass of component (a) is preferably 0.10 to 0.999, more preferably 0.20 to 0.995, and particularly preferably 0.50 to 0.99, relative to the entire resin composition of the present invention of 1.

In an embodiment, the 2-methylene-1,3-dicarbonyl compound is represented by formula (II) below:

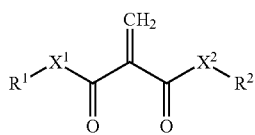
(II)

wherein
$X^1$ and $X^2$ each, independently, represent a single bond, O or $NR^3$,
wherein $R^3$ represents hydrogen or a monovalent hydrocarbon group; and
$R^1$ and $R^2$ are each, independently, hydrogen, a monovalent hydrocarbon group, or represented by formula (III) below:

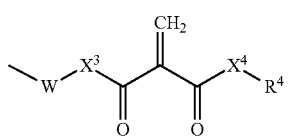
(III)

wherein
$X^3$ and $X^4$ each, independently, represent a single bond, O or $NR^5$,
wherein $R^5$ represents hydrogen or a monovalent hydrocarbon group;
W represents a spacer; and
$R^4$ represents hydrogen or a monovalent hydrocarbon group.

In an embodiment, the 2-methylene-1,3-dicarbonyl compound is represented by formula (IV) below:

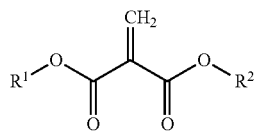
(IV)

wherein $R^1$ and $R^2$ are each, independently, hydrogen, a monovalent hydrocarbon group, or represented by formula (V) below:

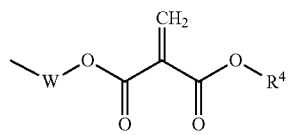
(V)

wherein
W represents a spacer; and
$R^4$ represents hydrogen or a monovalent hydrocarbon group.

In another embodiment, the 2-methylene-1,3-dicarbonyl compound is a dicarbonylethylene derivative represented by formula (VI) below:

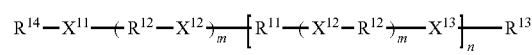
(VI)

wherein
$R^{11}$ represents a 1,1-dicarbonylethylene unit represented by formula (VII) below:

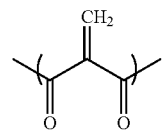
(VII)

each $R^{12}$ each, independently, represents a spacer;
$R^{13}$ and $R^{14}$ each, independently, represent hydrogen or a monovalent hydrocarbon group;
$X^{11}$ and each $X^{12}$ and $X^{13}$ each, independently, represent a single bond, O or $NR^{15}$, wherein $R^{15}$ represents hydrogen or a monovalent hydrocarbon group;
each m each, independently, represents 0 or 1; and
n represents an integer of 1 or greater and 20 or less;

As used herein, a monovalent hydrocarbon group refers to the group that results if one hydrogen atom is removed from a carbon atom in a hydrocarbon. Examples of the monovalent hydrocarbon group include an alkyl group, an alkenyl group, an alkynyl group, a cycloalkyl group, an alkyl-substituted cycloalkyl group, an aryl group, an aralkyl group, and an alkaryl group, and some of these may comprise heteroatoms such as N, O, S, P and Si.

Each of the monovalent hydrocarbon groups above may be substituted with alkyl, cycloalkyl, heterocyclyl, aryl, heteroaryl, allyl, alkoxy, alkylthio, hydroxyl, nitro, amide, azide, cyano, acyloxy, carboxy, sulfoxy, acryloxy, siloxy, epoxy, or ester.

The monovalent hydrocarbon group is preferably an alkyl group, a cycloalkyl group, an aryl group, or an alkyl group substituted with a cycloalkyl group, more preferably, an alkyl group, a cycloalkyl group, or an alkyl group substituted with a cycloalkyl group.

There are no particular restrictions on the carbon number of the alkyl group, alkenyl group, and alkynyl group (hereinafter collectively referred to as the "alkyl group etc."). The carbon number of the alkyl group is typically 1 to 18, preferably 1 to 16, more preferably 2 to 12, even more preferably 3 to 10, particularly preferably 4 to 8. The carbon number of the alkenyl group and the alkynyl group is typically from 2 to 12, preferably from 2 to 10, more preferably from 3 to 8, even more preferably from 3 to 7, and particularly preferably from 3 to 6. If the alkyl group etc. have a cyclic structure, the number of carbon atoms in the alkyl group etc. is typically 5 to 16, preferably 5 to 14, more preferably 6 to 12, even more preferably 6 to 10. The carbon number of the alkyl group etc. can be identified by, for example, reverse phase HPLC, described above, or nuclear magnetic resonance (NMR), There are no particular restrictions on the structure of the alkyl group etc. The alkyl group etc. may be linear or may have a side chain. The alkyl group etc. may have a chain structure or a cyclic structure (a cycloalkyl group, a cycloalkenyl group, and a cycloalkynyl group). The alkyl group etc. may have one or more other substituents. For example, the alkyl group etc. may have a substituent comprising an atom other than a carbon atom or a hydrogen atom as a substituent. Also, the alkyl group etc. may comprise one or more atoms other than a carbon atom or a hydrogen atom in a chain structure or a cyclic structure. Examples of the atoms other than a carbon atom or a hydrogen atom above include one or more of an oxygen atom, a nitrogen atom, a sulfur atom, a phosphorus atom, and a silicon atom.

Specific examples of the alkyl group include a methyl group, an ethyl group, art n-propyl group, an i-propyl group, an n-butyl group, an i-butyl group, a sec-butyl group, a t-butyl group, a pentyl group, an isopentyl group, a neopentyl group, a hexyl group, a heptyl group, an octyl group, and a 2-ethylhexyl group. Specific examples of the cycloalkyl group include a cyclopentyl group, a cyclohexyl group, a cycloheptyl group, and a 2-methylcyclohexyl group. Examples of the alkenyl group include a vinyl group, an allyl group, and an isopropenyl group. Specific examples of the cycloalkenyl group include a cyclohexenyl group.

When the 2-methylene-1,3-dicarbonyl compound is represented by formula (II) or (IV) above and $R^1$ and $R^2$ are both monovalent hydrocarbon groups, it is particularly preferable that $R^1$ and $R^2$ are, each, an alkyl group, a cycloalkyl group, an alkyl-substituted cycloalkyl group, an aryl group, an aralkyl group, or an alkaryl groups having 2 to 8 carbons.

As used herein, a spacer refers to a divalent hydrocarbon group, more specifically a cyclic, linear or branched, substituted or unsubstituted alkylene group. There are no particular restrictions on the carbon number of the alkylene group. The carbon number of the alkylene group is usually 1 to 12, preferably 2 to 10, more preferably 3 to 8, and still more preferably 4 to 8. If desired, the alkylene group may comprise a group comprising a heteroatom selected from N, O, S, P, and Si. The alkylene group may have an unsaturated bond. In an embodiment, the spacer is an unsubstituted alkylene group having 4 to 8 carbon atoms. Preferably, the spacer is a linear, substituted or unsubstituted alkylene group, more preferably, an alkylene group having a structure represented by the formula —$(CH_2)_n$—, wherein n is an integer from 2 to 10, preferably from 4 to 8, and wherein the carbon atoms at both ends are bonded to the remaining moieties of the 2-methylene-1,3-dicarbonyl compound.

Specific examples of the divalent hydrocarbon group for the spacer include, but are not limited to, a 1,4-n-butylene group and a 1,4-cyclohexylene dimethylene group.

If the 2-methylene-1,3-dicarbonyl compound has a spacer, the number of carbon atoms in the terminal monovalent hydrocarbon group is preferably 6 or less. That is, if the 2-methylene-1,3-dicarbonyl compound is represented by formula (II) or (IV) above, it is preferable that $R^4$ in formula (III) or (V) above be alkyl having 1 to 6 carbon atoms, but if either one of $R^1$ and $R^2$ is represented by formula (III) or formula (V) above, it is preferable that the other of $R^1$ and $R^2$ be alkyl having 1 to 6 carbon atoms. In this case, in formula (II) or formula (IV) above, both $R^1$ and $R^2$ may be represented by formula (III) or formula (V) above, and preferably, only either one of $R^1$ and $R^2$ is represented by formula (III) or formula (V) above. Preferably, the 2-methylene-1,3-dicarbonyl compound is represented by formula (IV) above.

Examples of particularly preferable compounds that have a spacer include compounds represented by formula (IV) above, wherein either one of $R^1$ and $R^2$ is any one of an ethyl group, an n-hexyl group or a cyclohexyl group, the other one is represented by formula (V) above, W is either a 1,4-n-butylene group or a 1,4-cyclohexylene dimethylene group, and $R^4$ is any one of an ethyl group, an n-hexyl group or a cyclohexyl group. Further, other particularly preferable compounds include compounds represented by formula (IV) above, wherein $R^1$ and $R^2$ are represented by formula (V) above, W is either a 1,4-n-butylene group or a 1,4-cyclohexylene dimethylene group, and $R^4$ is any one of an ethyl group, an n-hexyl group or a cyclohexyl group.

A variety of 2-methylene-1,3-dicarbonyl compounds are available from Sirrus Inc., Ohio, USA, and synthetic methods thereof are disclosed in publications of patent applications such as WO2012/054616, WO2012/054633 and WO2016/040261. If both ends of the structural unit represented by formula (I) above contained in the 2-methylene-1,3-dicarbonyl compound are bonded to oxygen atoms, 2-methylene-1,3-dicarbonyl compounds having a higher molecular weight in which a plurality of structural units represented by formula (I) above are liked via an ester bond and the spacer above can be produced by using methods known in the art such as the transesterification with a diol or a polyol disclosed in Japanese Translation of PCT international Application Publication No. JP-T-2.015-518503. A 2-methylene-1,3-dicarbonyl compound thus prepared may comprise a hydroxy group in $R^1$ and $R^2$ in formula (II) or formula (IV) above, $R^4$ in formula (III) or formula (V) above, and $R^{14}$ and $R^{13}$ in formula (VI) above. Component (a), which comprises 2-methylene-1,3-dicarbonyl compounds, can be obtained, as appropriate, by combining these 2-methylene-1,3-dicarbonyl compounds.

Specific examples of 2-methylene-1,3-dicarbonyl compounds suitable for component (a) include dibutyl methylene malonate, dipentyl methylene malonate, dihexyl methylene malonate, dicyclohexyl methylene malonate, ethyl octyl methylene malonate, propyl hexyl methylene malonate, 2-ethylhexyl-ethyl methylene malonate, ethylphenyl-ethyl methylene malonate and the like. These are preferable because of their low volatility and high reactivity. From the perspective of handleability, dihexyl methylene malonate and dicyclohexyl methylene malonate are particularly preferable.

[Initiator (Component (b))]

The resin composition of the present invention comprises an initiator (component (b)). The initiator is expected to contribute to the polymerization initiation reaction when the resin composition is cured by the Michael addition reaction. The initiator used in the present invention comprises a basic substance. The basic substance used as component (b) in the present invention may be used alone or two or more basic substances may be used together.

The basic substance used in the present invention typically comprises an organic base, an inorganic base, or an organometallic material.

Examples of the organic base include the amine compounds described below and the like. Examples of the inorganic base include alkali metal hydroxides such as lithium hydroxide, sodium hydroxide, potassium hydroxide and cesium hydroxide; alkaline earth metal hydroxides such as calcium hydroxide; alkali or alkaline earth metal carbonates such as lithium carbonate, potassium carbonate and sodium carbonate; metal hydrogen carbonates such as potassium hydrogen carbonate and sodium hydrogen carbonate; and the like. Examples of organic metal materials include organic alkali metal compounds such as butyllithium, t-butyllithium, and phenyllithium and organocopper reagents prepared therefrom; organic alkaline earth metal compounds such as methyl magnesium bromide, dimethyl magnesium, and phenyl magnesium chloride, and organocopper reagents prepared therefrom; and alkoxides such as sodium methoxide and t-butyl methoxide; and carboxylates such as sodium benzoate and the like.

When the resin composition of the present invention is used for an electronic material, if the resin composition comprises an inorganic base or an organometallic material, there is concern that this may have unintended impact on electrical characteristics in the electrical or electronic circuit in its vicinity. Therefore, the basic substance used in the present invention preferably does not comprise an alkali metal, an alkaline earth metal, a transition metal, or a halogen. In another embodiment, the basic substance used in the present invention is non-ionic.

The basic substance used in the present invention is preferably an organic base, and more preferably an amine compound. The amine compound is an organic compound having at least one of a primary amino group, a secondary amino group, and a tertiary amino group within the molecule, and may have two or more amino groups of different classes within the same molecule at the same time.

Examples of compounds having a primary amino group include, for example, methylamine, ethylamine, propylamine, butylamine, ethylenediamine, propylenediamine, hexamethylenediamine, diethylenetriamine, triethylenetetramine, ethanolamine, propanolamine, cyclohexylamine, isophorone diamine, aniline, toluidine, diaminodiphenylmethane, diaminodiphenylsulfone and the like.

Examples of compounds having a secondary amino group include, for example, dimethylamine, diethylamine, dipropylamine, dibutylamine, dipentylamine, dihexylamine, dimethanolamine, diethanolamine, dipropanolamine, dicyclohexylamine, piperidine, piperidone, diphenylamine, phenylmethylamine, phenylethylamine and the like.

Examples of compounds having a tertiary amino group include, for example, triethylamine, tributylamine, trihexylamine, triallylamine, 3-diethylaminopropylamine, dibutylaminopropylamine, tetramethylethylenediamine, tri-n-octylamine, dimethylaminopropylamine, N,N-dimethylethanolamine, triethanolamine, N,N-diethylethanolamine, N-methyl-N,N-diethanolamine, N,N-dibutylethanolamine, triphenylamine, 4-methyltriphenylamine, 4,4-dimethyltriphenylamine, diphenylethylamine, diphenylbenzylamine, N,N-diphenyl-p-anisidine, 1,1,3,3-tetramethylguanidine, N,N-dicyclohexylmethylamine, 1,4-diazabicyclo[2.2.2]octane, 2,6,10-trimethyl-2,6,10-triazaundecane, 1-benzylpiperidine, N,N-dimethylbenzylamine, N,N-dimethyldodecylamine, N-ethyl-N-methylbenzylamine, N,N-diethylbenzylamine and the like.

Examples of compounds having two or more different amino groups at the same time within the same molecule include, but are not limited to, guanidine compounds and imidazole compounds used as raw materials in embodiments of the present invention and the like. Examples of guanidine compounds include dicyandiamide, methylguanidine, ethylguanidine, propylguanidine, butylguanidine, dimethylguanidine, trimethylguanidine, phenylguanidine, diphenylguanidine, tolylguanidine, 1,1,3,3-tetramethylguanidine and the like. Examples of imidazole compounds include 2-ethyl-4-methylimidazole, 2-methylimidazole, 2-heptadecylimidazole, 2-phenyl-4,5-dihydroxymethylimidazole, 2-undecylimidazole, 2-phenyl-4-methyl-5-hydroxymethylimidazole, 2-phenyl-4-benzyl-5-hydroxymethylimidazole, 2,4-diamino-6-(2-methylimidazolyl-(1))-ethyl-s-triazine, 2,4-diamino-6-(2'-methylimidazolyl-(1'))-ethyl-s-triazine/isocyanuric acid adduct, 2-methylimidazole, 2-phenylimidazole, 2-phenyl-4-methylimidazole, 1-cyanoethyl-2-phenylimidazole, 1-cyanoethyl-2-methylimidazole-trimellitate, 1-cyanoethyl-2-phenylimidazole-trimellitate, N-(2-methylimidazolyl-1-ethyl)-urea, and N,N'-(2-methylimidazolyl-(1)-ethyl)-adipoyldiamide. However, the imidazole compounds are not limited to these compounds.

The amine compound above preferably comprises a secondary or tertiary amino group. If the amino group contained in the amine compound is primary, there is an increased likelihood that activated hydrogen generated from the amino group suppresses the polymerization reaction. The amine compound above more preferably comprises a tertiary amino group. In other words, the amine compound is more preferably a tertiary amine compound.

The amine compound above is preferably free of an alkali metal, an alkaline earth metal, a transition metal or a halogen.

The amine compound above is preferably free of groups comprising active hydrogen such as a hydroxy group and a sulfhydryl group.

In the present invention, if the basic substance is in solid form when the resin composition is cured, the reaction proceeds on the surface of the basic substance, and the reaction does not extend throughout the entire resin composition, resulting in uneven curing. For this reason, the basic substance is preferably liquid at 80° C., and more preferably liquid at 25° C.

In general, the basicity of a basic substance can be evaluated (measured) by the acid dissociation exponent $pK_a$, or $-\log K_a$, which is the common logarithm of the reciprocal of $K_a$, which is the acid dissociation constant between the basic substance in neutral form and its conjugate acid. The $pK_a$ of the conjugate acid of a basic substance or a basic group may simply be referred to herein as the $pK_a$ of the basic substance or the basic group.

The $pK_a$ of the basic substance used in the present invention is preferably 8 or greater, more preferably 9 or greater, even more preferably 10 or greater, and most preferably 11 or greater. The resin composition of the present invention comprises a 2-methylene-1,3-dicarbonyl compound having a molecular weight of 180 or higher, and if the $pK_a$ of the basic substance is less than 8, the resin composition does not cure within a predetermined time. This is believed to be attributable to the large steric hindrance in the vicinity of the functional groups stemming from the fact that the resin composition of the present invention comprises a 2-methylene-1,3-dicarbonyl compound having a molecular weight of 180 or higher, with the result that a basic substance having a $pK_a$ of less than a certain value is not able to readily initiate the polymerization reaction.

The acid dissociation exponent ($pK_a$) between a basic substance in neutral form and its conjugate acid, described above, can be determined as appropriate by methods known to those skilled in the art such as an electrochemical method and a spectroscopic method. As used herein, unless otherwise specified, "$pK_a$" refers to the value of $pK_a$ estimated using the software MarvinSketch 17.22.0, developed by ChemAxon, on the basis of the chemical structure and selecting water as the solvent, with the following settings: Temperature: 298 K, Mode: macro, Acid/base prefix: static. However, if the basic substance of interest has a plurality of basic sites such as amino groups within the single molecule, the largest $pK_a$ value is employed as the $pK_a$ of the basic substance.

The molecular weight of the amine compound above is preferably from 100 to 1,000, more preferably from IOU to 500, and even more preferably from 110 to 300. If the molecular weight of the amine compound is less than 100, its volatility is high, giving rise to concern that, among other things, it may affect components in the vicinity and cause the cured product to have variable physical properties. If the molecular weight of the amine compound exceeds 1,000, this may lead to, among other things, an increase in the viscosity of the amine compound and a decrease in the dispersibility of the amine compound in the resin composition.

The initiator of the present invention may be used alone or two or more types may be used in combination.

Specific examples of amine compounds that are suitable for the initiator include, but are not limited to, triethylamine, 1,4-diazabicyclo[2.2.2]octane, 1,1,3,3-tetramethylguanidine, N,N-dimethylbenzylamine, N-ethyl-N-methylbenzylamine, 2,6,10-trimethyl-2,6,10-triazaundecane, N,N-dimethyloctylamine, N,N-dimethyloctadecylamine, and N,N-dimethyldodecylamine.

The initiator of the present invention may be such that it has been rendered inactivated by separation or latentization and can be activated by any stimulus such as heat, light, mechanical shear, or the like. More specifically, the initiator may be a latent curing catalyst such as a microcapsule, or those based on ion dissociation or an inclusion compound, and may be in a form that generates a base on exposure to heat, light, electromagnetic waves, ultrasonic waves, or physical shear. Further, the resin composition of the present invention can be used as a two-part mixing adhesive.

In the present invention, the amount of the basic substance is preferably 0.01 mol % to 30 mol %, and more preferably, 0.01 mol % to 10 mol %, based on the total amount (100 mol %) of the 2-methylene-1,3-dicarbonyl compounds in the resin composition. If the amount of the basic substance is less than 0.01 mol %, it results in inconsistent curing. Conversely, if the amount of the basic substance is more than 30 mol %, a large amount of the basic substance that is not chemically bonded with the resin matrix remains in the cured product, causing, among other things, deterioration in physical properties of the cured product as well as bleeding.

[Anionic Polymerization Inhibitor (Component (c))]

The anionic polymerization inhibitor (component (c)) is used to moderately reduce the curing speed of the resin composition of the present invention.

Component (c) in the present invention comprises at least one borate ester compound. It has not been known in the art to use a borate ester compound as an anionic polymerization inhibitor in a resin composition comprising a 2-methylene-1,3-dicarbonyl compound.

Component (b) has a basic moiety (an amino group if component (b) is an amine compound), and polymerization is initiated by a reaction of the basic moiety with the reactive moiety (the exomethylene carbon) in component (a), Although the details of the mechanism are not fully understood, it is believed that the polymerization reaction of component (a) is inhibited by component (c) or a substance produced by the hydrolysis of a portion of component (c). Selecting the suitable amounts of component (h) and component (c), therefore, enables the achievement of the desired curing time according to the intended use of the resin composition.

As described above, protic acids are known as anionic polymerization inhibitors (stabilizers) for controlling the rate of the polymerization reaction of 2-methylene-1,3-dicarbonyl compounds. Their effectiveness as anionic polymerization inhibitors is very high, and addition of a small amount of a protic acid to a resin composition comprising a 2-methylene-1,3-dicarbonyl compound significantly extends the curing time. However, since a slight change in protic acid content causes a large change in curing time, when it is desired to extend or shorten the curing time by a small amount, the protic acid content needs to be increased or decreased by an extremely small amount, in some cases as small as 0.01 mass % (100 ppm). When only a protic acid is used as an anionic polymerization inhibitor, therefore, it is difficult to finely adjust the curing time.

In addition, in the actual manufacture of a resin composition, it is not practically feasible to maintain a strictly fixed composition for it, and variability inevitably occurs in the amount of each component. As described above, since the curing time varies greatly with slight changes in protic acid content, it is difficult, when only a protic acid is used as an anionic polymerization inhibitor, to consistently produce a resin composition of which the various properties, especially curing time, are within a certain acceptable range.

It is easier to increase or decrease the amount of a protic acid by a small amount if the protic acid is used in the form of a solution diluted with a solvent. However, when a resin composition obtained in this way is cured, there is increased concern about the worsening of the working environment due to the volatilization of the solvent, the deterioration of the physical properties of the cured product due to the generation of voids, and even bleeding and other phenomena, which are undesirable in the manufacture of small electronic components.

In view of the above, it is difficult to control the rate of the polymerization reaction in a resin composition comprising a 2-methylene-1,3-dicarbonyl compound only by adjusting the amount of a protic acid.

By contrast, the effect of borate ester compounds as anionic polymerization inhibitors is lower than those of protic acids, and it requires considerably more of a borate ester compound to extend curing time by the same amount of time than in the case of a protic acid. This means, however, that, in contrast to the case of a protic acid, a slight change in the borate ester compound content of the resin composition (that is, unless there is an extremely large change in its content) does not significantly change curing time. Therefore, when a borate ester compound is used as an anionic polymerization inhibitor, it is not necessary to increase or decrease its content by a very small amount to adjust curing time, and this enables easy fine adjustment of the curing time. There is no need even to dilute the borate ester compound with a solvent.

In addition, when a borate ester compound is used, the inevitable variability in compositional ratios that occurs in the actual production of a resin composition does not change the curing time significantly, which allows consistent production of resin compositions of which the various properties, especially curing time, are within a certain acceptable range.

In an embodiment, the borate ester compound has a structure in which a boron atom is bonded to three identical monovalent hydrocarbon groups, each via an oxygen atom.

Examples of borate ester compounds used as component (c) include trimethyl borate, triethyl borate, tri-n-propyl borate, triisopropyl borate, tri-n-butyl borate, tri-s-butyl borate, tri-t-butyl borate, tripentyl borate, triallyl borate, trihexyl borate, tricyclohexyl borate, trioctyl borate, trinonyl borate, tridecyl borate, tridodecyl borate, trihexadecyl borate, trioctadecyl borate, tris(2-ethylhexyloxy)borane, tribenzyl borate, triphenyl borate, tri-o-tolyl borate, tri-m-tolyl borate, and 2,2'-oxybis(5,5'-dimethyl-1,3,2-dioxaborinane). Of these, in view of availability, and the safety or storage stability of the compounds, trimethyl borate, triethyl borate, tri-n-propyl borate, triisopropyl borate, tri-n-butyl borate, tri-t-butyl borate and tri-o-tolyl borate are preferable, and triisopropyl borate, tri-t-butyl borate and tri-o-tolyl borate are more preferable. These borate ester compounds may be used alone or in combination of two or more.

There are no particular restrictions on the amount of component (c) in the resin composition of the present invention, and the amount of component (c) can be adjusted as appropriate so that the desired curing time of the resin composition is achieved. It is preferable to use 0.05 to 10 mass %, more preferably 0.1 to 5 mass %, even more preferably 0.2 to 5 mass %, and particularly preferably 0.3 to 3 mass % of component (c) relative to the mass of the resin composition excluding the solids such as fillers.

[Stabilizer (Component (d))]

The resin composition of the present invention may further comprise a stabilizer (component (d)). Despite the fact that component (c) above also has the effect of stabilizing the resin composition, a stabilizer may further be used if necessary.

The stabilizer is a substance, other than component (c), for enhancing the stability of the resin composition during storage, and is added to suppress the occurrence of unintended polymerization reactions due to radicals or basic components. The 2-methylene-1,3-dicarbonyl compound may undergo unintended radical polymerization reactions triggered by radicals that are accidentally generated. Also, the 2-methylene-1,3-dicarbonyl compound may undergo anionic polymerization reactions due to contamination by extremely small amounts of basic components. The occurrence of such unintended polymerization reactions due to radicals or basic components can be suppressed by adding a stabilizer.

Stabilizers known in the art can be used for the stabilizer, and for example, a strong acid or a radical scavenger can be used. Specific examples of stabilizers include trifluoromethanesulfonic acid, maleic acid, methanesulfonic acid, difluoroacetic acid, trichloroacetic acid, phosphoric acid, dichloroacetic acid, N-nitroso-N-phenylhydroxylamine aluminum, triphenylphosphine, 4-methoxyphenol, and hydroquinone.

Among these, preferable stabilizers are at least one selected from maleic acid, methanesulfonic acid, N-nitroso-N-phenylhydroxylamine aluminum and 4-methoxyphenol. Stabilizers known in the art such as those disclosed in JP 2010-117545 A and JP 2008-184514 A can also be used for the stabilizer.

A single stabilizer may be used alone, or two or more may be used in combination.

The resin composition of the present invention, in addition to components (a) to (d), described above, may, as necessary, comprise an insulating or conductive filler, a surface treatment agent such as a coupling agent, a pigment, a plasticizer, or the like.

The resin composition of the present invention comprises components (a) to (c), and optionally, (d) and other components such as the tiller discussed above, if necessary. The resin composition of the present invention can be prepared by mixing these components. Apparatuses known in the art can be used for mixing. For example, mixing can be performed by apparatuses known in the art such as a Henschel mixer or a roll mill. These ingredients may be mixed simultaneously, or it may be such that some are mixed first, and the remainder are mixed later, The resin composition of the present invention may comprise components other than components (a) to (d) above and the filler etc. above, such as, for example, a flame retardant, an ion trapper, an antifoaming agent, a leveling agent, a foam breaker, etc. as long as they do not impair the effectiveness of the present invention.

The resin composition of the present invention can be used as a one-part adhesive, in particular, a one-part adhesive for electronic components. Specifically, the resin composition of the present invention, is suitable for the adhesion and sealing of electronic components. More specifically, the resin composition of the present invention can be used for the adhesion and sealing of components for camera modules, and is particularly suitable for adhesion in image sensor modules. In the present invention, an electronic component adhered using the resin composition of the present invention is also provided. Further, an electronic component sealed using the resin composition of the present invention is also provided. Further, the resin composition of the present invention can be used both as an insulating composition and as a conductive composition.

As illustrated in FIG. 1, the resin composition of the present invention, for example, can be used to adhere an IR cut filter 20 to a printed circuit board 24. The resin composition of the present invention can be used to adhere an image sensor 22 to the printed circuit board 24. The resin composition of the present invention can be used to adhere a support 18 to the printed circuit board 24. A jet dispenser, an air dispenser, or the like can be used to supply the resin composition to the adherend surface. The resin composition of the present invention can be cured at normal temperature without heating. The resin composition of the present invention can also be cured by heating at a temperature of 25 to 80° C., for example. The heating temperature is preferably 50 to 80° C. The heating time is, for example, 0.5 to 4 hours.

The resin composition of the present invention can also be used for an image sensor module other than a camera module. For example, it can be used for adhesion and sealing of components of an image sensor module that may be incorporated in a fingerprint authentication device, a face authentication device, a scanner, a medical device, or the like.

The resin composition of the present invention can also be used as a constituent material of a film or a prepreg. In particular, the resin composition of the present invention is suitable for a constituent material of a coverlay film for protecting wiring patterns, an interlayer adhesive film for a multilayer wiring substrate, and a prepreg. This is because the resin composition of the present invention only has a very small amount of volatile components, and it, therefore, is not prone to the generation of voids. The film or prepreg comprising the resin composition of the present invention, preferably, can be used for electronic components.

The prepreg comprising the resin composition of the present invention can be produced by methods known in the art such as, for example, a hot melt method or a solvent method. When a hot melt method is used, a prepreg can be produced without dissolving the resin composition of the present invention in an organic solvent, by first applying a temporary coating of the resin composition of the present invention onto a release paper having good releasability against the resin composition and then laminating it on a sheet of fiber substrate, or by directly applying a coating using a die coater, or by other methods. When a solvent method is used, a sheet of fiber substrate is first immersed in a resin composition varnish prepared by dissolving the resin composition of the present invention in an organic solvent, thereby impregnating the resin composition varnish into the sheet of fiber substrate, and then the sheet of fiber substrate is dried to obtain a prepreg.

The film comprising the resin composition of the present invention can be obtained from the resin composition of the present invention by methods known in the art. For example, the resin composition of the present invention can be diluted with a solvent to form a varnish, which is applied to at least one side of a support, dried, and then provided as a film with a support or as a film detached from the support.

EXAMPLES

Examples and comparative examples of the present invention will be described below. The present invention is not limited to the following Examples and Comparative Examples.

[Calculating Vapor Pressures]

Vapor pressures at various temperatures were calculated for 2-methylene-1,3-dicarbonyl compounds used in the present invention, using HSPiP (4th Edition 4.1.05, Y-MB method). Table 1 shows the vapor pressures (unit: mmHg) at various temperatures for dihexyl methylene malonate (DHMM) and dicyclohexyl methylene malonate (DCHMM)

TABLE 1

| Sample | Molecular Weight | Temperature [° C.] | | | | | |
|---|---|---|---|---|---|---|---|
| | | 25 | 50 | 80 | 100 | 120 | 150 |
| DHMM | 284.4 | 0.0000 | 0.0003 | 0.0077 | 0.0463 | 0.2116 | 1.4038 |
| DCHMM | 280.4 | 0.0000 | 0.0001 | 0.0019 | 0.0120 | 0.0587 | 0.4234 |

[Preparing Resin Compositions]

The raw materials for the resin compositions used in the following Examples and Comparative Examples are as follows.

2-Methylene-1,3-dicarbonyl compounds (component (a)):

DHMM (manufactured by Sirrus Inc.)

DCHMM (manufactured by Sirrus Inc.)

The specific structures for the 2-methylene-1,3-dicarbonyl compounds listed above are shown by the chemical formulas in Table 2 below.

TABLE 2

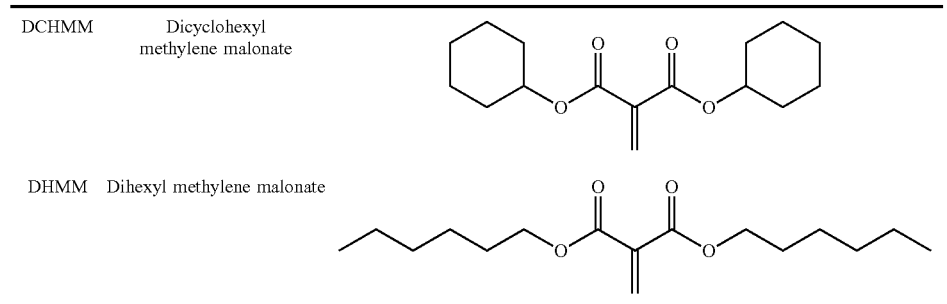

| DCHMM | Dicyclohexyl methylene malonate |
| DHMM | Dihexyl methylene malonate |

Initiators (component (b)):

TEA Triethylamine (Wako Pure Chemical Industries, Ltd.) Molecular weight: 101.19

DMDA N,N-Dimethyldodecylamine (Wako Pure Chemical Industries, Ltd.) Molecular weight: 213.41

DMBA N,N-Dimethylbenzylamine (Wako Pure. Chemical Industries, Ltd.) Molecular weight: 135.21

EMBA N-Ethyl-N-methylbenzylamine (Tokyo Chemical Industry Co., Ltd.) Molecular weight: 149.24

Anionic polymerization inhibitors (component (c))

B(OiPr)$_3$ Triisopropyl borate (Tokyo Chemical Industry Co., Ltd.) Molecular weight: 188.07

B(OtBu)$_3$ Tri-t-butyl borate (Tokyo Chemical Industry Co., Ltd.) Molecular weight: 230.16

B(O-o-tol)$_3$ Triorthotolyl borate (Tokyo Chemical Industry Co., Ltd.) Molecular weight: 332.2.1

Anionic polymerization inhibitor (component (c'))

TFA Trifluoroacetic acid (Tokyo Chemical. Industry Co., Ltd.) Molecular weight: 114.02

Examples 1 to 1.6 and Comparative Examples 2 and 3

To 1.00 g of component (a) in a polypropylene microtube, component (c) or (c') was added dropwise so that its ratio by mole to component (a) was the value shown in Table 3, followed by mixing. To the resulting mixture, component (b) was added so that its ratio by mole to component (a) was the value shown in Table 3, and the mixture was again shaken with a vortex mixer to obtain a resin composition.

The time elapsed from the moment this mixing was completed until the resin composition practically lost fluidity (gel time) was measured at room temperature (25° C.). Table 3 shows the gel time (unit: min) fox' each of the resin compositions along with the ratio by mole of each component in the resin composition. Table 3 also shows the ratios by mass (unit: mass ppm) of components (c) and (c') to the entire resin composition, The expression "practically lost fluidity" means that a resin composition that fills a microtube to about half its capacity reached a state in which no obvious change in shape is observed under gravity for 10 seconds after the microtube is rapidly turned horizontal from a vertical position.

Comparative Examples 1 and 4 to 8

Gel times were measured in the same manner as in Examples 1 to 16 and Comparative Examples 2 to 3, except that component (c) was not added. The gel time (unit: min) for each of the resin compositions is shown in Table 3.

TABLE 3

|  |  |  | Comparative Example 1 | Example 1 | Example 2 | Example 3 | Comparative Example 2 | Comparative Example 3 | Comparative Example 4 |
|---|---|---|---|---|---|---|---|---|---|
| Component (a) | DHMM | (eq) | 1 | 1 | 1 | 1 | 1 | 1 | 1 |
|  | DCHMM | (eq) |  |  |  |  |  |  |  |
| Component (b) | TEA | (eq) | 005 | 0.05 | 0.05 | 0.05 | 0.05 | 0.05 |  |
|  | DMDA | (eq) |  |  |  |  |  |  |  |
|  | DMBA | (eq) |  |  |  |  |  |  | 0.01 |
|  | EMBA | (eq) |  |  |  |  |  |  |  |
| Component (c) | B(O/Pr)$_3$ | (eq) |  | 0.005 | 0.007 | 0.010 |  |  |  |
|  | B(OtBu)$_3$ | (eq) |  |  |  |  |  |  |  |
|  | B(O-o-tol)$_3$ | (eq) |  |  |  |  |  |  |  |
| Component (c') | TFA | (eq) |  |  |  |  | 0.00249 | 0.00025 |  |
| Ratio by mass of components (c) and (c') relative to the entire composition | (ppm) |  |  | 3100 | 4500 | 6500 | 1000 | 100 |  |
| Gel time | (min) |  | 8 | 109 | 115 | 130 | 280 | 43 | 4 |

|  |  |  | Example 4 | Example 5 | Example 6 | Comparative Example 5 | Example 7 | Example 8 |
|---|---|---|---|---|---|---|---|---|
| Component (a) | DHMM | (eq) | 1 | 1 | 1 | 1 | 1 | 1 |
|  | DCHMM | (eq) |  |  |  |  |  |  |
| Component (b) | TEA | (eq) |  |  |  |  |  |  |
|  | DMDA | (eq) |  |  |  |  |  |  |
|  | DMBA | (eq) | 0.01 | 0.01 | 0.01 | 0.005 | 0.005 | 0.005 |
|  | EMBA | (eq) |  |  |  |  |  |  |
| Component (c) | B(O/Pr)$_3$ | (eq) |  |  |  |  |  |  |
|  | B(OtBu)$_3$ | (eq) | 0.005 | 0.010 | 0.020 |  | 0.01 | 0.02 |
|  | B(O-o-tol)$_3$ | (eq) |  |  |  |  |  |  |
| Component (c') | TFA | (eq) |  |  |  |  |  |  |
| Ratio by mass of components (c) and (c') relative to the entire composition | (ppm) | 4000 | 8000 | 16000 |  | 8000 | 16000 |
| Gel time | (min) | 27 | 24 | 24 | 8 | 51 | 54 |

|  |  |  | Comparative Example 6 | Example 9 | Example 10 | Example 11 | Comparative Example 7 | Example 12 |
|---|---|---|---|---|---|---|---|---|
| Component (a) | DHMM | (eq) | 1 | 1 | 1 | 1 | 1 | 1 |
|  | DCHMM | (eq) |  |  |  |  |  |  |
| Component (b) | TEA | (eq) |  |  |  |  |  |  |
|  | DMDA | (eq) |  |  |  |  |  |  |
|  | DMBA | (eq) | 0.05 | 0.05 | 0.05 | 0.05 |  |  |
|  | EMBA | (eq) |  |  |  |  | 0.03 | 0.03 |
| Component (c) | B(O/Pr)$_3$ | (eq) |  |  |  |  |  |  |
|  | B(OtBu)$_3$ | (eq) |  | 0.005 | 0.010 | 0.020 |  | 0.005 |
|  | B(O-o-tol)$_3$ | (eq) |  |  |  |  |  |  |
| Component (c') | TFA | (eq) |  |  |  |  |  |  |
| Ratio by mass of components and (c') relative to the entire composition | (c) |  | 4000 | 8000 | 16000 |  | 4000 |
| Gel time | (min) | 3 | 6 | 6 | 7 | 22 | 316 |

|  |  |  | Example 13 | Example 14 | Comparative Example 8 | Example 15 | Example 16 |
|---|---|---|---|---|---|---|---|
| Component (a) | DHMM | (eq) | 1 | 1 |  |  |  |

TABLE 3-continued

|  |  |  |  |  |  |  |  |
|---|---|---|---|---|---|---|---|
|  | DCHMM | (eq) |  |  | 1 | 1 | 1 |
| Component (b) | TEA | (eq) |  |  |  |  |  |
|  | DMDA | (eq) |  |  | 0.02 | 0.02 | 0.02 |
|  | DMBA | (eq) |  |  |  |  |  |
|  | EMBA | (eq) | 0.03 | 0.03 |  |  |  |
| Component (c) | B(O/Pr)₃ | (eq) |  |  |  |  |  |
|  | B(OtBu)₃ | (eq) | 0.010 | 0.020 |  |  |  |
|  | B(O-o-tol)₃ | (eq) |  |  |  | 0.010 | 0.024 |
| Component(c') | TFA | (eq) |  |  |  |  |  |
| Ratio by mass of components (c) and (c') relative to the entire composition |  |  | 8000 | 16000 |  | 12000 | 27000 |
| Gel time |  | (min) | 351 | 362 | 2 | 20 | 21 |

(Discussion on Results)

Examples 1 to 16, Comparative Example 1 and Comparative Examples 4 to 8 show that borate ester compounds serving as component (c) are effective in extending the gel time of the resin compositions regardless of the type of component (a) and component (b), and function as anionic polymerization inhibitors.

Comparison of Examples 1 to 3 suggests that even if there is inevitable variability in the amount of component (c) in the actual production of a resin composition, its influence on the gel time will be minor. This is also clear from the comparisons of Examples 4 to 6, Examples 7 to 8, Examples 9 to 11, Examples 12 to 14, and Examples 15 to 16, respectively.

By contrast, when TEA, a protic acid, was used as component (c') (Comparative Examples 2 and 3), the curing times of the resin compositions were extended by addition of a smaller amount than in the cases of the borate ester compounds. However, comparison of Comparative Examples 2 and 3, for example, shows that when the amount of TFA was increased from 100 mass ppm to 1,000 mass ppm, the increase in curing time was as long as 237 minutes. A simple calculation indicates that if there is 10 g of this resin composition, a change in the amount of TFA of just over 1 mg will result in a change in curing time of about 30 minutes. It is extremely difficult to control the curing time of a resin composition such as this by changing the amount of TFA.

In addition, when such resin composites are actually manufactured, the variability in curing time caused by the unavoidable variability in compositional ratios is expected to be significantly large.

The gel time of component (a) can be made to vary over a wide range, from a few minutes to several hours, by selecting suitable types of components (b) and (c) (Examples 1, 4, 9 and 12).

Furthermore, the gel time of component (a) can be adjusted more finely by increasing or decreasing the amount of component (b) (Examples 5, 7 and 10).

Thus, adjusting the types and amounts of components (h) and (c) allows stable control of curing time over a wide range. In particular, the use of component (c) enables consistent production of resin compositions having long gel times, which would be difficult to achieve simply by reducing the amount of component (h) alone (Comparative Examples 4 and 5).

The above demonstrates that in a resin composition comprising a 2-methylene-1,3-dicarbonyl compound and an initiator in the form of a basic substance, borate ester compounds are suitable for adjusting the curing time as desired and for the consistent production of resin compositions with minimal variability in properties. By contrast, protic acids are not suitable for such purposes because the use of a protic acid leads to difficulties in adjusting the curing time and in the consistent production of resin compositions with minimal variability in properties.

INDUSTRIAL APPLICABILITY

The resin composition of the present invention can be manufactured consistently with reduced variability in properties, leads to improved productivity, and is suitable for the manufacture of electronic components.

REFERENCE SIGNS LIST

10 Camera module
12 Lens
14 Voice coil motor
16 Lens unit
18 Support
20 Cutting filter
22 Image sensor
24 Printed circuit board
30, 32, 34 Adhesive

What is claimed is:

1. A resin composition, comprising components (a) to (c) below:
   (a) at least one 2-methylene-1,3-dicarbonyl compound,
   (b) an initiator comprising at least one basic substance, and
   (c) an anionic polymerization inhibitor comprising at least one borate ester compound;
   wherein the 2-methylene-1,3-dicarbonyl compound is a compound comprising at least one structural unit represented by formula (I) below

(I)

2. The resin composition according to claim 1, wherein the borate ester compound is at least one selected from the group consisting of triisopropyl borate, tri-t-butyl borate, and tri-o-tolyl borate.

3. The resin composition according to claim 1, wherein the basic substance is an amine compound.

4. The resin composition according to claim 1, wherein the basic substance is a tertiary amine compound.

5. The resin composition according to claim 1, wherein the 2-methylene-1,3-dicarbonyl compound has a molecular weight of 180 or higher and 10,000 or lower.

6. A one-part adhesive comprising the resin composition according to claim 1.

7. The one-part adhesive according to claim 6, for electronic components.

8. The resin composition according to claim 2, wherein the basic substance is an amine compound.

9. The resin composition according to claim 2, wherein the basic substance is a tertiary amine compound.

10. The resin composition according to claim 2, wherein the 2-methylene-1,3-dicarbonyl compound has a molecular weight of 180 or higher and 10,000 or lower.

11. A one-part adhesive comprising the resin composition according to claim 2.

12. The one-part adhesive according to claim 11, for electronic components.

* * * * *